United States Patent [19]

Taniguchi et al.

[11] Patent Number: 5,127,287
[45] Date of Patent: Jul. 7, 1992

[54] HYDRAULIC BREATHING APPARATUS FOR A HYDRAULIC DEVICE

[75] Inventors: Takuji Taniguchi, Okazaki; Kazunori Ishikawa, Toyota; Kunihiro Iwatsuki, Toyota; Hideaki Ootsubo, Toyota, all of Japan

[73] Assignees: Aisin AW Co., Ltd.; Toyota Jidosha Kabushiki Kaisha, both of Japan

[21] Appl. No.: 758,200

[22] Filed: Sep. 12, 1991

Related U.S. Application Data

[63] Continuation of Ser. No. 381,182, Jul. 18, 1989, abandoned.

[30] Foreign Application Priority Data

Jul. 19, 1988 [JP] Japan .................. 63-180541

[51] Int. Cl.⁵ .................... F16H 57/02; F16K 47/00
[52] U.S. Cl. ............................... 74/606 R; 74/606 A; 210/168; 251/127
[58] Field of Search ............... 74/606 R, 606 A, 607; 137/334; 220/374, 203, 373, 209; 192/113 A; 251/127; 210/168; 475/200

[56] References Cited

U.S. PATENT DOCUMENTS

| | | | |
|---|---|---|---|
| 840,492 | 1/1907 | Hoppes | 251/127 |
| 2,565,674 | 8/1951 | Zachlin | 251/127 |
| 3,805,836 | 4/1974 | Veale | 137/334 |
| 4,098,143 | 7/1978 | Kubo et al. | 74/606 R |
| 4,351,203 | 9/1982 | Fukunaga | 74/606 R |
| 4,446,755 | 5/1984 | Takahashi | 192/113 A |
| 4,468,979 | 9/1984 | Inagaki et al. | 74/606 R |
| 4,498,353 | 2/1985 | Kitade | 74/606 R |
| 4,506,562 | 3/1985 | Yamaura et al. | 220/374 X |
| 4,554,844 | 11/1985 | Hamano | 74/606 A X |
| 4,586,531 | 5/1986 | Lindell | 137/334 |
| 4,595,118 | 6/1986 | Azuma et al. | 74/606 R |
| 4,632,142 | 12/1986 | Shames et al. | 251/127 X |
| 4,839,041 | 6/1989 | Kuwayama et al. | 210/168 |
| 4,911,035 | 3/1990 | Taguchi | 74/606 R |
| 4,995,971 | 2/1991 | Droste et al. | 210/168 |

*Primary Examiner*—Vinh T. Luong
*Attorney, Agent, or Firm*—Lorusso & Loud

[57] ABSTRACT

A hydraulic breather for a valve body in an automatic transmission, in which is disposed hydraulic equipment, for example, linear solenoid valves. The breather separates oil in the oil pan from the oil in the hydraulilc equipment when the automatic transmission is at work while allowing clean oil from the oil pan to enter the hydraulic equipment when the automatic transmission is at rest. The breating hole is provided in the form of an oil passage extending from hydraulic equipment within the valve body and includes an open-end section disposed in an upper part of the valve body. The open-end is located at a point higher than the working oil level in the automatic transmission. When the automatic transmission is at work, oil in the oil pan is used to lubricate, so the oil level is at its lowest level and the open-end section is above that oil level and thereby connects with air space in the valve body. When the automatic transmission is at rest, the oil level in the oil pan rises and oil from the oil pan enters into the breathing hole.

5 Claims, 3 Drawing Sheets

HYDRAULIC BREATHING APPARATUS FOR A HYDRAULIC DEVICE

This application is a continuation of application Ser. No. 07/381,182, filed Jul. 18, 1989, now abandoned.

BACKGROUND OF THE INVENTION

1. Field of the Invention

The present invention relates to a hydraulic breather for a valve body of an automatic transmission, particularly to a hydraulic breather for use with a linear solenoid valve.

2. Description of the Prior Art

Generally, a valve body in an automatic transmission includes a lot of valves and is immersed in oil contained in an oil pan.

Operation of a solenoid such as a linear solenoid valve disposed in the valve body requires immersion in oil. The oil space within the solenoid cannot be sealed because of volume variations caused by the action of the solenoid.

Conventionally, a solenoid valve is directly immersed in an oil pan and is fixed to the outside of the valve body with bolts. Even in the case of a solenoid valve being disposed inside the valve body, the solenoid valve is immersed in oil received directly from the oil pan through a breathing hole.

However, as the oil in the oil pan contains foreign materials such as minute steel fragments from the lubricated gears, there may be cases when the foreign materials cause malfunction of the solenoid valve.

Particularly, a linear solenoid valve which requires precise and subtle operation is apt to be caused to malfunction by even a minute foreign material. Therefore it is strongly required that such a linear solenoid valve receive clean oil.

SUMMARY OF THE INVENTION

The object of the present invention is to provide hydraulic breathing for a hydraulic device in an automatic transmission, with simple structure and without malfunction caused by foreign materials. The hydraulic breathing structure of the present invention allows hydraulic equipment immersed in the working oil of a valve body to communicate with oil in an oil pan through a breathing oil passage when an automatic transmission is at rest while separating the oil of the valve body from that of the oil pan when an automatic transmission is at work so that the hydraulic equipment always receives clean oil.

In an automatic transmission, a hydraulic device (1) including a hydraulic operating device, i.e. valve (5) is provided in a valve body (3) in an oil pan (2). The valve body (3) has a breathing hole in the form of an oil passage (7) extending upward from the hydraulic equipment (5) so that the oil passage (7) opens in an upper portion of the valve body (3) and that opening is disposed above the working oil level (A) of the automatic transmission.

It is preferable to provide an oil pool (11) in the oil passage (7) and to connect the upper part of the oil pool (11) with the hydraulic valve (5), and it is more preferred to further provide a piece of magnet at the bottom of the oil pool (11).

In another preferred embodiment, wiers are provided in a flow passage leading to the hydraulic valve (5).

Based on the above structure, when the automatic transmission is at work, the oil in the oil pan (2) is used to lubricate etc., the oil level is lowered to the level shown as (A) in the drawing FIGS. Accordingly, the oil passage (7) of the hydraulic breathing apparatus (6) is above the oil level (A) and thus the oil passage (7) communicates with air in the oil pan (2). While the automatic transmission is at rest, the oil level in the oil pan rises to the level shown as (B), so that the oil passage (7) communicates with the oil in the oil pan (2).

The numbers and letters, which are given in the parentheses above refer to the drawings which do not define the invention but, rather, describe the preferred embodiments. While the numbers or letters indicate identical members, means, devices, elements and mechanisms, different naming from that of the embodiments is sometimes used in describing the broader concept.

DESCRIPTION OF THE PREFERRED EMBODIMENTS

Figure 4:
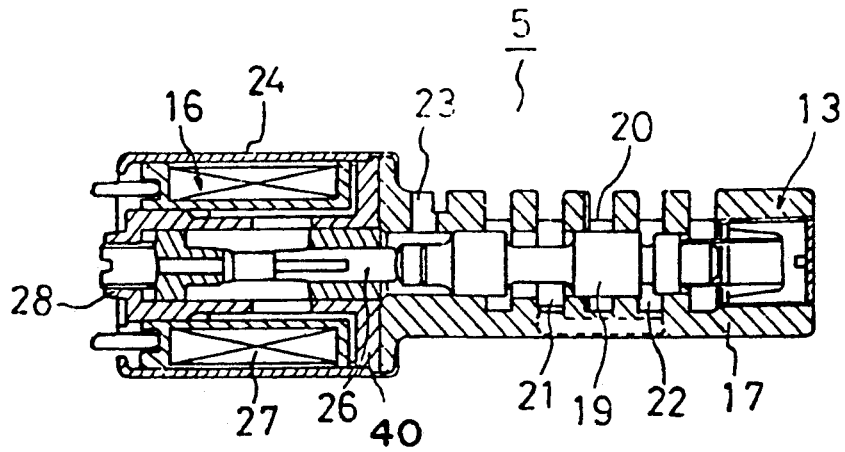
FIG. 4 is a total side view of a linear solenoid valve to which the present invention is applied.
Figure 5:
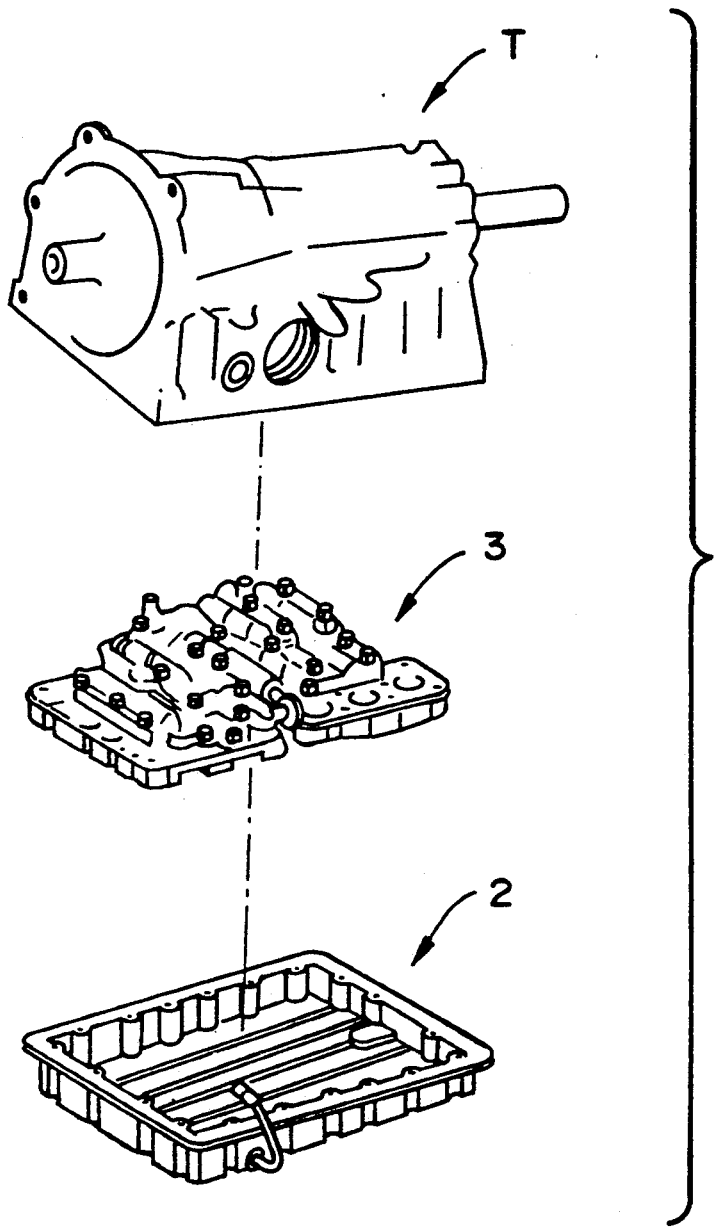
FIG. 5 is a schematic view illustrating the prior art relationship of a transmission T, a valve body 3 and an oil pan 2.

A linear solenoid valve 5, which for example is used for lock-up clutch control, throttle pressure control and so on, as shown in FIG. 4 is disposed in a valve body of an automatic transmission. Such a linear solenoid valve 5 is composed of a regulating valve section 13 and a electromagnetic section 16. The regulating valve section 13 includes a valve sleeve 17 and a spool 19. The valve sleeve 17 includes an inlet port 20, an output port 21, a feed back port 22 and a breathing hole 23. On the other hand, the electromagnetic section 16 includes a cylindrical case 24 where a thick magnetic cylindrical core 25 is disposed coaxially with the case 24. Furthermore, mounted in the annular space between the case 24 and the core 25 is a coil assembly 27. While in a coaxial hollow of the core 25, a non-magnetic pushing rod 26 is disposed. At one end of the pushing rod 26 a plunger 28 is fixed. The magnetic section 16 is continuously supplied with oil from the breathing hole 23 formed on the regulating valve section 13.

Figure 1:
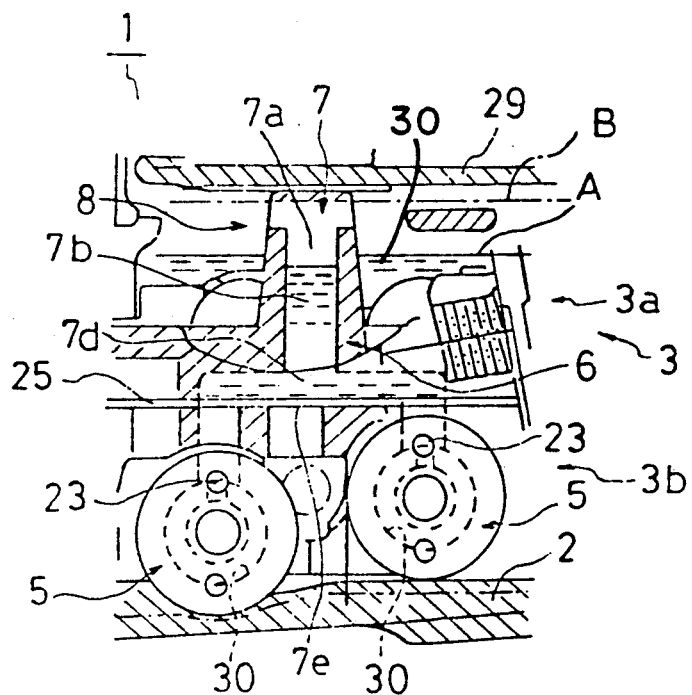
FIG. 1 is a cross-sectional view of a first embodiment of the hydraulic breathing apparatus of the present invention.

A linear solenoid valve 5, as shown in FIG. 1, is disposed in a valve body 3 which is contained in a oil pan 2. The oil pan 2 is disposed at the bottom of a transmission case 29.

In detail, the valve body 3 is composed of a separator 25, an upper valve body 3a and a lower valve body 3b. The linear solenoid valve 5 is contained in a hole 30 which is formed in the lower valve body 3b. The breathing hole 23 is connected to a oil passage 7 formed in the valve body 3. The oil passage 7 extends through an extension 8 which extends into the upper valve body 3a through oil reservoir 30. The extension 8 has an open-end section 7a. The oil passage 7 further extends through a first breathing passage 7b formed directly below the open-end section 7a, a third, horizontal breathing passage 7d formed directly below the passage 7b, and a second breathing passage 7c connecting to the breathing hole 23. Therefore the oil passage 7 is composed of, in order, the open-end section 7a, the first breathing passage 7b, the third breathing passage 7d and the second breathing passage 7c. The open-end section 7a is located above the oil level (A) indicating the working oil level in the automatic transmission oil pan 2.

When hydraulic pressure is received from a pump at the inlet port 20 of the valve sleeve 17, the hydraulic pressure is applied to at least one hydraulic servo of the automatic transmission from the output port 21, depending on the given conditions.

At this time, force generated in the electromagnetic section 16 pushes to spool 19 through a predetermined distance via the plunger 28 and the pushing rod 26. Because of this movement the fluid space within the electromagnetic section 16 varies and superfluous oil is bled through the oil passage 7 from the breathing hole 23. As the breathing hole 7 is open to the upper part of the valve body 3, the volume change is suitably absorbed by a rise or fall of the oil level without sealing the electromagnetic section 16. When the automatic transmission is at work, the oil in the oil pan 2 is used to lubricate various parts in the automatic transmission, therefore the oil level (A) is lower than the open-end section 7a, so that no oil flows into the open-end section 7a. Consequently, even if minute steel fragments in oil are stirred by the turning of the automatic transmission, no foreign materials such as minute steel fragments flow into the open-end section 7a. While the automatic transmission is at rest, the oil used to lubricate or to control falls into the oil pan 2, so that the oil level in the oil pan 2 rises (refer to B in FIG. 1). At this time, because the oil in the oil pan 2 is at rest, foreign materials such as minute steel fragments having high specific gravity separate to the bottom, so that the oil in the vicinity of the surface of the oil level is clean. Consequently the clean oil enters the oil passage 7 from the oil surface (B) through the open-end section 7a, and the linear solenoid valve 5 always receives clean oil. Because of the above arrangement, foreign materials such as minute steel fragments having high specific gravity are prevented from entering the linear solenoid valve 5, and malfunction of the linear solenoid valve 5 is prevented.

Figure 2:
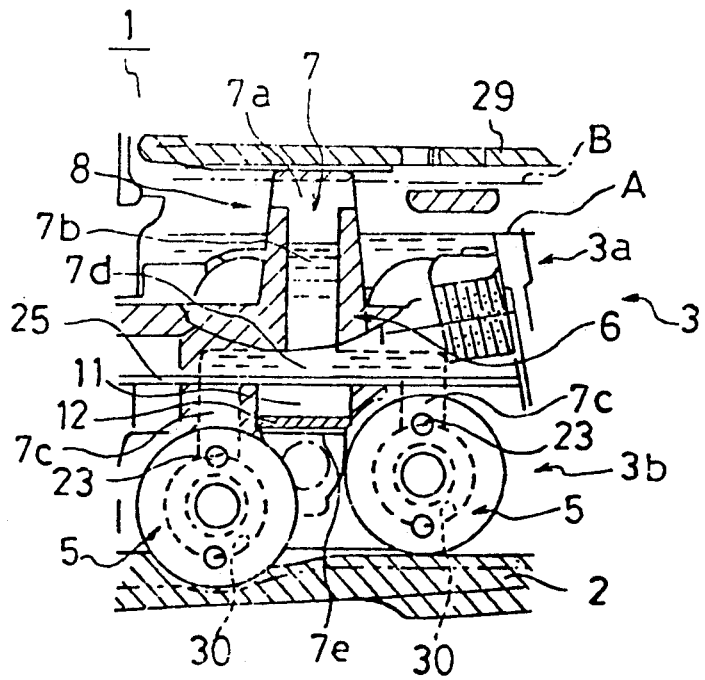
FIG. 2 is a cross-sectional view of a second embodiment of the present invention.

The second embodiment which partially modifies the first embodiment is explained along with FIG. 2.

The oil passage 7 of the second embodiment includes an oil pool 11 which is formed just below the third breathing passage 7d and is disposed in the lower valve body 3a. At the bottom of the oil pool 11 is a piece of magnet 12.

Because of the above arrangement, when the automatic transmission is at rest and the open-end section 7a receives oil from the oil pan 2, even if foreign materials such as minute steel fragments mistakenly flow into the breathing passage 7b, such foreign materials are caught in the oil pool 11 and do not flow along the lateral breathing passage 7d, furthermore the foreign materials are attracted by the piece of magnet 12. Therefore such foreign materials are surely and certainly prevented from entering the linear solenoid valve 5.

Figure 3:
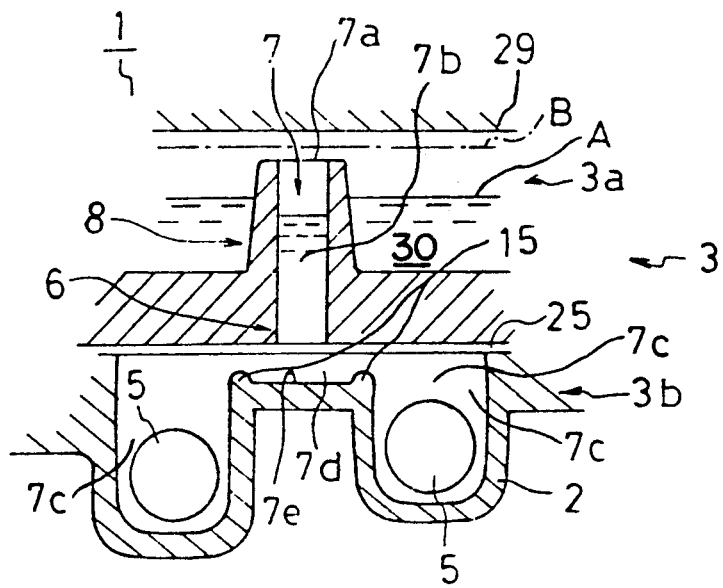
FIG. 3 is a cross-sectional view of a third embodiment of the present invention.

The third embodiment which partially modifies the previous embodiments is explained along with FIG. 3.

The breathing hole 7 includes a pair of weirs 15 formed where the second breathing passage 7c enters the third breathing passage, i.e. horizontal passage section 7d.

Because of the above arrangement, when the automatic transmission is at rest and the open-end section 7a receives oil from the oil pan 2, even if foreign materials such as minute steel fragments mistakenly flow into the oil passage 7, such foreign materials are caught between the weirs 15 and do not flow in to the second breathing passage 7c. Such foreign materials are collected at the bottom 7e.

The advantages of the present invention are summarized as follows:

Because the open-end section (7a) of oil passage (7) is disposed above than the working oil level in the automatic transmission oil pan (2), foreign materials such as minute steel fragments, having high specific gravity and which are stirred when the automatic transmission is at work, are prevented from entering into the oil passage (7), and clean oil is supplied to the valve (5) by oil from the oil pan (2) entering the oil passage (7) only when the automatic transmission is at rest.

In the embodiment of FIG. 2 with oil pool (11) protecting hydraulic valves (5), even if foreign material such as minute steel fragments are allowed to enter into the oil passage (7), such foreign materials are trapped in the oil pool (11). Furthermore, provided that a piece of magnet (12) is disposed at the bottom of the oil pool (11), such foreign materials are attracted by the magnet and are further secured against entry into the hydraulic valves (5).

In the embodiment of FIG. 3 the weirs (15) of predetermined height trap foreign materials such as minute steel fragments which enter into the oil passage (7) while the automatic transmission is at rest, and such foreign materials are thereby prevented from entering the hydraulic valves (5).

Provided that the valve (5) is a linear solenoid valve, the oil passage (7), though simple in structure, can surely and certainly prevent foreign materials from entering. Accordingly, proper operation of the linear solenoid valve is better secured.

What is claimed is:

1. A hydraulic valve body for an automatic transmission comprising:

an upper valve body portion including an oil reservoir for collecting oil used in lubrication of the transmission;

a lower valve body portion containing a plurality of hydraulic operating devices immersed in oil;

separating means for separating the oil collected in said upper valve body portion from oil in said lower valve body portion; and oil passage means, in communication with oil within said lower valve body portion and extending into said upper valve body portion and terminating within said upper valve body portion at a point above the normal working level of oil within said upper valve body portion, for preventing oil communication between said upper and lower valve body portions when the transmission is working but allowing oil communication between said upper and lower valve body portions when the oil in said upper valve body portion rises to a level above said working level when the transmission is at rest, said oil passage means providing hydraulic breathing to compensate for changes in the volume of oil space within said hydraulic operating devices.

2. The valve body of claim 1 wherein said fluid passage means comprises means defining an oil pool interposed between said upper and lower portions for collecting solid particulates contained in the oil entering said lower portion from said upper portion, thereby preventing said solid particulates from entering said hydraulic operating devices.

3. The valve body of claim 2 further comprising a magnetic member associated with said pool for attracting and securing particulate matter collected within said pool.

4. The valve body of claim 1 wherein at least one of said hydraulic operating devices is a linear solenoid valve including an electromagnetic section and a regulating valve section, said regulating valve section including a valve sleeve, a breathing hole formed in the valve sleeve and a spool slidably mounted in the valve sleeve, and wherein said oil passage means connects with said breathing hole in said valve sleeve.

5. The valve body of claim 2 wherein said oil passage means comprises a horizontal breathing passage section with a pair of weirs defining said pool.

* * * * *